United States Patent Office 3,367,227
Patented Feb. 6, 1968

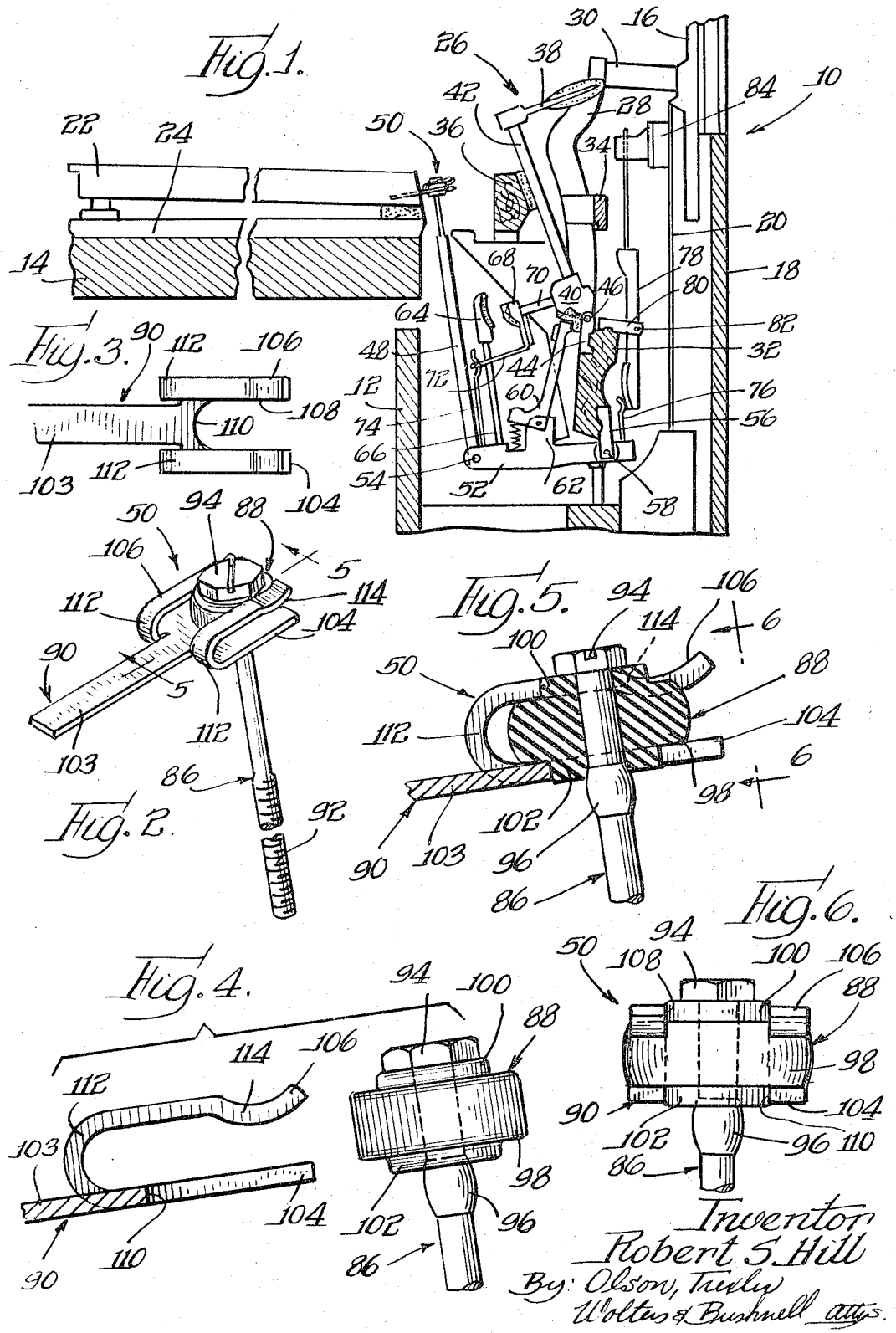

3,367,227
RELEASABLE COUPLING FOR PIANO
ACTION MECHANISM
Robert S. Hill, Holly Springs, Miss., assignor to The Wurlitzer Company, Chicago, Ill., a corporation of Ohio
Filed Oct. 17, 1966, Ser. No. 587,232
7 Claims. (Cl. 84—240)

This invention relates generally to key-operated musical instruments and more particularly to couplings used to transmit pulling motions in the actuating mechanisms of such instruments.

Because of a general desire on the part of both manufacturers and tuners to have the action mechanism of pianos and analogous instruments connected to the individual key levers for quick assembly and separation, couplings comprising a fork and a cooperating rubber grommet have been developed in the past. However, the fork element of such a coupling ordinarily comprises nothing more than a simple flat blade with an axially opening slot, the grommet being provided with confronting flanges to confine the fork and resist its motion in opposite directions axially of the grommet.

The present invention takes as an important object the provision of a releasable coupling in which a tough, elastic member is securely gripped by a rigid yoke.

A more general object of the invention is to provide a new and improved coupling for use in transmitting pulling motions in a piano action mechanism.

Another object of the invention is to provide a motion-transmitting coupling that is characterized by a high degree of mechanical efficiency.

Still another object of the invention is to provide a motion-transmitting coupling having long-lasting mechanical efficiency.

Yet another object of the invention is to provide a motion-transmitting coupling in which the elastic member is not required to be flexurally stiff in order to avoid undesirable motion internally of the coupling.

These and other objects and features of the invention will become more apparent from a consideration of the following descriptions.

A coupling in accord with the invention includes a reciprocable link and a bushing of tough, elastic material confined on the link. The bushing includes a medial body portion and reduced-diameter neck portions extending axially from opposite ends of the body portion. In addition, the coupling includes a yoke that is engageable with the bushing to complete a motion-transmitting train from the link to a rigid member connected to the yoke, the yoke including upper and lower portions spaced to confine the body portion of the bushing therebetween. Furthermore, the upper and lower portions of the yoke are axially slotted to receive the neck portions of the bushing.

In order that the principles of the invention may be readily understood, a single embodiment thereof, arranged for coupling a piano key lever to an action sticker, but to which the application is not to be restricted, is shown in the accompanying drawing, wherein:

FIG. 1 is an end elevational view taken in cross-section through a piano structure to show the mounting and cooperation of the various parts of an individual action mechanism;

FIG. 2 is an enlarged perspective view of the coupling used to transmit pulling motion from the key lever to the sticker in the action mechanism of FIG. 1;

FIG. 3 is a top plan view of the rigid yoke employed in the coupling of FIG. 2;

FIG. 4 is a further enlarged, side elevational view of the coupling of FIG. 2, showing the yoke disassembled from the bushing and link;

FIG. 5 is an enlarged view in cross-section taken substantially along the line 5—5 of FIG. 2; and FIG. 6 is an end elevational view taken substantially along the line 6—6 of FIG. 5.

Referring now in detail to the drawing, specifically to FIG. 1, a piano structure indicated generally by the reference numeral 10 includes a front panel 12, a horizontal support panel 14 and a string frame 16. In accordance with conventional practices in the construction of upright pianos, the string frame 16 is associated with a back panel 18 and supports the several piano strings, such as piano string 20. In further accord with conventional practices, a key lever 22 is disposed to overlie a keybed 24; and a balance rail, not shown, is mounted on the keybed 24 to support and fulcrum the key lever 22.

Depression of the forward end of key lever 22 is arranged to cause a striking of the corresponding piano string 20 through a piano action mechanism indicated generally by the numeral 26. The action mechanism 26 is mounted in the piano structure by means of a number of action brackets 28, each of which is fastened to the string frame 16 by means including a tubular action spacer 30. A main rail 32, a spring rail 34 and a hammer rail 36 extend horizontally through the piano structure to be affixed to each of the action brackets 28 for purposes of supporting the individual action components.

Continuing with reference to FIG. 1, the action mechanism 26 includes a hammer 38 which is mounted to a butt knuckle 40 by a hammer shank 42, the butt knuckle 40 being pivotally mounted to the main rail 32 by a butt flange 44 and a pivot pin 46. Depression of the piano key lever 22 is specifically arranged to actuate hammer 38 into percussive engagement with the piano string 20 by means of a sticker or abstract 48 that is detachably affixed at one end to the key lever by means of a coupling 50. The coupling 50 is specially constructed as will be described more fully hereinafter. The sticker 48 is swingably mounted at its lower end to a whip 52 by means of a pivot pin 54, and the whip 52 is pivotally mounted to the main rail 32 by a whip flange 56 and a pivot pin 58. Thus, the whip 52 and the butt knuckle 40 are mounted to swing about pivot axes which are spaced apart from one another. A fly or jack 60 is pivotally mounted and spaced apart from the whip 52 by means including a fly flange 62 that is integral with the whip 52. Depression of piano key lever 22 causes actuation of the hammer 38 by a force transmitted thereto through the fly or jack 60 and the butt knuckle 40.

A backcheck 64 is mounted on the whip 52 in upstanding relationship by means of a backcheck wire or rod 66; and a catcher 68 is secured to the butt knuckle 40 by means of a catcher stem or shank 70 which radiates from the butt knuckle. In order to provide a flexible connection between the butt knuckle 40 and the whip 52, a bridle strap 72 is attached to the catcher shank 70 at its juncture with the catcher 68. The flexible connection between the whip 52 and the butt knuckle 40 is completed by a bridle wire member 74 which is secured at one end to the whip 52 to extend toward a position generally adjacent the butt knuckle 40 to receive the bridle strap 72.

The action mechanism 26 also includes a metal spoon 76 which is affixed to the whip 52 in upstanding relationship at that end of the whip which is opposite the connection with the abstract or sticker 48. Upon actuation of the whip 52 by means of the key lever 22, the spoon 76 contacts the lower end of a damper lever 78, damper lever 78 being swingably mounted to the main rail 32 by means of a damper lever flange 80 and a pivot pin 82. The spoon 76 is specifically arranged to operate damper lever 78 so as to retract a damper head 84 from contact with the piano string 20 immediately in advance of the hammer 38 striking the string.

Turning to a consideration of FIGS. 2 and 5, the coupling 50 comprises, in general, a reciprocable link 86, a bushing 88 and a yoke 90. At its lower end, the link is provided with an external screw thread 92 for progressively entering an axial bore formed in the sticker 48. At its opposite end, the link 86 is provided with a diametrically slotted, hexagonally shaped head 94 which defines a tool-engageable, radial protuberance. A radially extending, ovoid collar 96 is provided on the link 86 between the head 94 and the thread 92, spaced axially apart from the head 94 to confine the bushing 88 snugly against the underside of head 94. The bushing 88 itself is fabricated from a tough, elastic material, such as neoprene rubber, and is fashioned to comprise a medial body portion 98 and reduced-diameter neck portions 100 and 102, the neck portions 100 and 102 extending axially from opposite ends of the body portion 98. The bushing 88 has a central bore to receive the link 86.

The yoke 90 is releasably engageable with the bushing 88 to complete a motion-transmitting train from the link 86 to the key lever 22; and for attachment to the key lever, the yoke 90 includes a flat stem or blade 103 which is piercingly assemblable to the end of the key lever. For confining the body portion of the bushing 88 in gripped relationship, the yoke 90 is provided with an upper portion 106 and a lower portion 104 which are spaced to receive the body portion 98 of the bushing and which are fashioned respectively with similar, axially opening slots 108 and 110, as is shown in FIGS. 3 and 6, to receive the neck portions 100 and 102 respectively. The upper portion 106 is connected to the lower portion 104 by transversely spaced bights 112. Accordingly, the slot 108 continues from the upper portion 106 and through the bights 112 so that the upper portion, in essence, comprises two separate straps that are a continuation of the lower portion 104. Accordingly, the entire yoke 10 may be made from a single flat piece of material.

In order to facilitate piercing assembly of the yoke 90 with the key lever 22, the stem portion 103 is arranged coplanar with the lower portion 104, thus forming a straight spine to concentrate driving force applied to the forward edge of the lower portion 104. It is also desirable to arrange one of the portions 104 and 106 for restricting the position of the bushing 88 once it has been assembled with the yoke 90. So as not to destroy the coplanar relationship of the lower portion 104 in the stem 103, such a provision is made in the upper portion 106; and in particular, the tips of the upper portion 106 are provided with sections 114 which are deflected toward the lower portion 104, as is best shown in FIG. 4.

In further accord with the present invention, the upper and lower portions 104 and 106 of yoke 90 are spaced to confine the body portion 98 of the bushing 88 compressibly therebetween, thus forming a gripped engagement which cooperates with the confining action of the deflected sections 114. In one useful embodiment of the invention, the upper and lower portions 104 and 106 have been spaced to compress the body portion 98 approximately 0.025 inch. In other practical embodiments of the invention, such compression may be omitted and reliance had entirely on the action of the deflected sections 114. Further considering the relative dimensions of the cooperating parts, the upper neck portion 100 will be seen to be possessed of a greater height than the thickness of the material of the upper yoke portion 106. This arrangement exposes the head 94 and the tool-engageable formation thereof for ready access to a regulating tool. It also serves to position the head 94 away from the edges of the slot formed in the upper yoke portion whereby to avoid metal-to-metal contact.

From the foregoing descriptions, it will be apparent that the portions 104 and 106 of the yoke 90 define respective socket leaves which grip the bushing 88 in a secure manner but which permit ready extraction of the bushing and simple reassembly. In these latter movements, the bushing will, of course, be pushed in and out of the vertically aligned, axially opening slots 108 and 110 formed respectively in the upper and lower yoke portions. Furthermore, the tightly confined and compressed or gripped engagement of the yoke and bushing insures a highly efficient transfer of movement from the key lever 22 to the sticker 48. The gripped assembly of the yoke and bushing also eliminates the need for flexural stiffness in the bushing to avoid undesirable motion internally of the coupling 50; and accordingly, softer and more resilient compounds may be used for the material of bushing 88. Concomitantly longer life can be expected for the bushing. Moreover, it will be apparent from a consideration of FIGS. 2, 5 and 6 that the bushing 88 is symmetrical about its vertical axis and therefore may be fed and handled in automatic equipment.

The specific example herein shown and described should be considered as being primarily illustrative. Various changes, beyond those described, will, no doubt, occur to those skilled in the art; and such changes are to be understood as forming a part of this invention insofar as they fall within the spirit and scope of the appended claims.

The invention is claimed as follows:

1. A coupling for use in transmitting pulling motion in a piano action mechanism, said coupling comprising: a reciprocable link having radial protuberances spaced axially apart thereon; a bushing of tough, elastic material confined on said link between said protuberances, said bushing including a medial body portion and reduced-diameter neck portions extending axially from opposite ends of said body portion; and a yoke engageable with said bushing to complete a motion-transmitting train from said link to a rigid member connected to said yoke, including upper and lower portions spaced to confine said body portion therebetween, said upper and lower portions being axially slotted to receive said neck portions.

2. A coupling according to claim 1 wherein the tips of said upper and lower portions have deflected sections for restricting the position of said body portion.

3. A coupling according to claim 1 wherein said yoke further includes a stem aligned axially with one of said upper and lower portions whereby to concentrate the driving force used in assembling said yoke to said rigid member.

4. A coupling according to claim 1 wherein said upper portion is connected to said lower portion by transversely spaced bights.

5. A coupling according to claim 1 wherein said link has a mounting formation away from said protuberances for use in securing said link to a movable action member.

6. A coupling according to claim 1 wherein one of said protuberances is terminally positioned and said terminally positioned protuberance includes a tool-engageable formation; and wherein the neck portion of said bushing adjacent said terminally positioned protuberance is of greater height than the thickness of said upper yoke portion whereby to expose said formation for ready access to a regulating tool.

7. A coupling according to claim 1 wherein said upper and lower portions of said yoke are spaced closely to confine said body portion compressibly therebetween.

References Cited

UNITED STATES PATENTS

| | | | |
|---|---|---|---|
| 3,040,614 | 6/1962 | Behning | 84—240 |
| 3,076,371 | 2/1963 | Andersen | 84—240 |
| 3,139,780 | 7/1964 | Andersen et al. | 84—240 |
| 3,139,782 | 7/1964 | Andersen | 84—240 |
| 3,171,320 | 3/1965 | Underwood | 84—240 |
| 3,228,277 | 1/1966 | Roehrig | 84—240 |
| 3,319,503 | 5/1967 | Corey | 84—240 |

RICHARD B. WILKINSON, *Primary Examiner.*

CHARLES M. OVERBEY, *Assistant Examiner.*